US008428081B2

(12) United States Patent
Diab et al.

(10) Patent No.: US 8,428,081 B2
(45) Date of Patent: Apr. 23, 2013

(54) METHOD AND SYSTEM FOR CONNECTOR AND/OR CABLE WITH CONFIGURABLE ANTENNA FOR ETHERNET AND WIRELESS APPLICATIONS

(75) Inventors: Wael William Diab, San Francisco, CA (US); Harry Shannon Tyson, Jr., Austin, TX (US)

(73) Assignee: Broadcom Corporation, Irvine, CA (US)

( * ) Notice: Subject to any disclaimer, the term of this patent is extended or adjusted under 35 U.S.C. 154(b) by 293 days.

(21) Appl. No.: 12/785,102

(22) Filed: May 21, 2010

(65) Prior Publication Data

US 2011/0243151 A1    Oct. 6, 2011

Related U.S. Application Data

(60) Provisional application No. 61/321,333, filed on Apr. 6, 2010.

(51) Int. Cl.
*H04J 4/00*    (2006.01)

(52) U.S. Cl.
USPC .......................................................... 370/464

(58) Field of Classification Search .......... 370/464–467, 370/351, 357, 359, 389, 419, 901, 902, 906, 370/903; 326/62, 63; 379/1.01, 9, 9.06, 379/399.01, 413.02; 398/115–116
See application file for complete search history.

(56) References Cited

U.S. PATENT DOCUMENTS

| | | | |
|---|---|---|---|
| 4,377,859 A * | 3/1983 | Dunning et al. | 370/376 |
| 7,149,474 B1 * | 12/2006 | Mikhak | 455/41.2 |
| 7,443,805 B1 * | 10/2008 | Bynum | 370/254 |
| 7,617,342 B2 | 11/2009 | Rofougaran | |
| 7,769,049 B2 * | 8/2010 | Pepper et al. | 370/474 |
| 2004/0122956 A1 | 6/2004 | Myers et al. | |
| 2005/0157748 A1 * | 7/2005 | Park | 370/466 |
| 2008/0205417 A1 * | 8/2008 | Li | 370/401 |
| 2011/0243152 A1 * | 10/2011 | Goncalves et al. | 370/463 |

FOREIGN PATENT DOCUMENTS

| | | |
|---|---|---|
| WO | WO0133773 | 5/2001 |
| WO | WO2009070062 | 6/2009 |

OTHER PUBLICATIONS

EPO Communication dated Jul. 20, 2011 in Application No. BP32P516EP (3 pages).

* cited by examiner

*Primary Examiner* — Fan Ng
(74) *Attorney, Agent, or Firm* — Brinks Hofer Gilson & Lione (57) ABSTRACT

A configurable Ethernet connector comprises a first interface comprising wired and wireless interfaces and a second interface comprising wired and optical interfaces. The configurable Ethernet connector receives signals via one interface and converts the signals for transmission via the other interface and vice versa. Signal conversion in both directions may occur simultaneously. The configurable Ethernet connector comprises an antenna and/or a wireless access point. A cable attached to the configurable Ethernet connector may comprise an antenna. The configurable Ethernet connector may provide at least of subset of antenna functionality to a communication device. The configurable Ethernet connector and/or a corresponding attached connector may comprise one or more of PHY devices. A corresponding connector that is coupled to the configurable Ethernet connector may sense communication protocols and/or capabilities of the configurable Ethernet connector and may be configured accordingly. Wireless maintenance of a switch may be performed via the configurable Ethernet connector.

20 Claims, 6 Drawing Sheets

METHOD AND SYSTEM FOR CONNECTOR AND/OR CABLE WITH CONFIGURABLE ANTENNA FOR ETHERNET AND WIRELESS APPLICATIONS

CROSS-REFERENCE TO RELATED APPLICATIONS/INCORPORATION BY REFERENCE

This application makes reference to and claims priority to U.S. Provisional Application Ser. No. 61/321,333 which was filed on Apr. 6, 2010, entitled "Method and System for Connector and/or Cable with Configurable Antenna for Ethernet and Wireless Applications," and which is incorporated herein by reference in its entirety.

This application also makes reference to:
U.S. patent application Ser. No. 12/701,381, which was filed on Feb. 5, 2010;
U.S. patent application Ser. No. 12/731,908, which was filed on Mar. 25, 2010;
U.S. patent application Ser. No. 12/752,065, which was filed on Mar. 31, 2010;
U.S. patent application Ser. No. 12/731,933, which was filed on Mar. 25, 2010; and
U.S. patent application Ser. No. 12/702,173, which was filed on Feb. 8, 2010.

Each of the above stated applications is hereby incorporated herein by reference in its entirety.

FIELD OF THE INVENTION

Certain embodiments of the invention relate to communication systems. More specifically, certain embodiments of the invention relate to a connector and/or cable with an antenna for Ethernet and wireless applications.

BACKGROUND OF THE INVENTION

Nowadays, communication devices may incorporate a plurality of features, for example, a mobile phone, a digital camera, an Internet browser, a gaming device, a Bluetooth headphone interface and/or a location device. In this regard, the communication devices may be operable to communicate via various wire-line and/or wireless networks such as local and/or wide area networks, wireless local and/or wide area networks, cellular networks and wireless personal area networks, for example. In this regard, endpoint devices may communicate via various wireless and/or wire-line switches, routers, hubs, access points and/or base stations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a connector and/or cable with an antenna for Ethernet and wireless applications.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for a connector and/or cable with an antenna for Ethernet and wireless applications. In accordance with various embodiments of the invention, one or more processors and/or circuits in a configurable Ethernet connector comprises a first interface and a second interface. The first interface may comprise a wired interface and a wireless interface that are configurable to communicate corresponding wired and wireless signals. The second interface may comprise a wired interface and an optical interface that are configurable to communicate corresponding wired and optical signals. A signal may be received via the first interface or the second interface. In instances when the received signal comprises a wireless signal that is received via the first interface, the received wireless signal may be converted to one of a wired Ethernet signal and an optical Ethernet signal, for communication by the second interface. In instances when the received signal comprises a wired signal that is received via the first interface, the signal may be communicated by the second interface or may be converted to an optical signal for communication by the second interface. In instances when the received signal comprises a wired Ethernet signal that is received via the second interface, the received wired Ethernet signal may be communicated via the first interface or may be converted to a wireless signal for communication by the first interface. In instances when the received signal comprises an optical Ethernet signal that is received via the second interface, the received optical Ethernet signal may be converted to one of a wireless signal and a wired signal for communication by the first interface. The conversion of the signal received via said first interface, and the conversion of the signal received via said second interface may occur concurrently.

The Ethernet connector may comprise one or both of an antenna and a wireless access point. In various exemplary embodiments of the invention, a cable that is coupled to the Ethernet connector may comprise an antenna. The Ethernet connector may provide at least a subset of antenna functionality to a communication device. The Ethernet connector may provide one or more of full antenna functionality, enhancement of antenna functionality and/or extension of antenna functionality to a communication device that is communicatively coupled to the Ethernet connector. The configurable Ethernet connector and/or a corresponding connector that may be coupled to the configurable Ethernet connector may comprise one or more of a plurality of Ethernet PHY devices, a plurality of types of Ethernet PHY devices, a plurality of optical PHY devices, and a plurality of types of optical PHY devices. The plurality of PHY devices and/or plurality of types of PHY devices may be integrated on a single chip. A corresponding connector that is coupled to the Ethernet connector may sense communication protocols and/or communication capabilities of the Ethernet connector. The corresponding connector may be configured based on communication protocols and/or communication capabilities of the Ethernet connector. The Ethernet connector may receive a wireless signal that comprises information for servicing and/or maintaining a communication device that is coupled to the Ethernet connector, and may transmit the signal to the communication device.

Figure 1A:
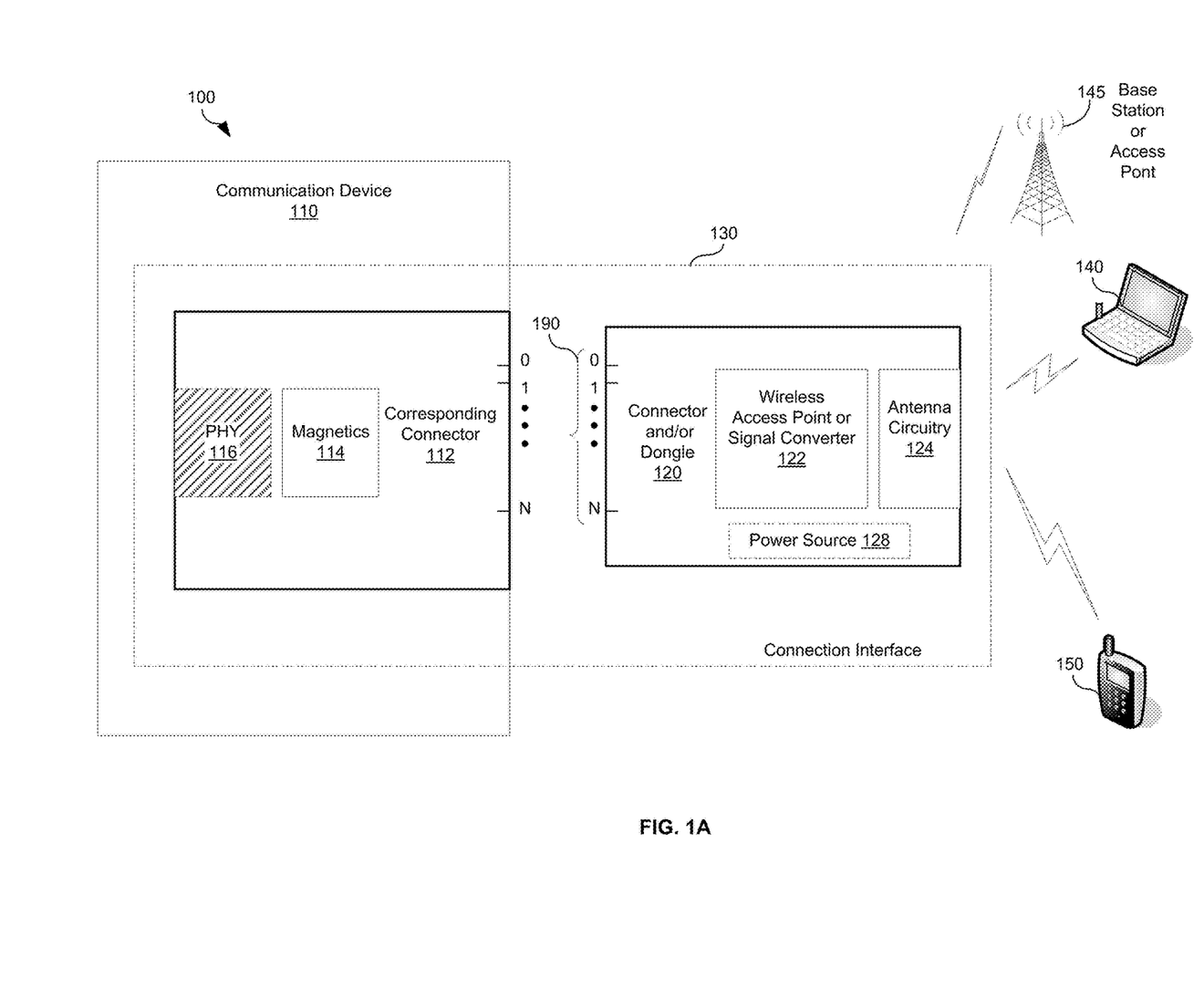
FIG. 1A is a block diagram illustrating an exemplary connector and/or connection interface comprising a wireless access point or signal converter, in accordance with an embodiment of the invention.

FIG. 1 is a block diagram illustrating an exemplary configurable connector and/or connection interface comprising a wireless access point or signal converter, in accordance with an embodiment of the invention. Referring to FIG. 1, there is shown, a communication system 100 comprising communication devices 110, 140 and 150 and a wireless base station or access point 145. In addition, there is shown a connector and/or connection interface 130 that may comprise a configurable Ethernet connector 120 that comprises copper and/or optical connections 190, a wireless access point or signal converter 122, antenna circuitry 124 and a power source 128. In addition, the connector and/or connection interface 130 may comprise a corresponding connector 112, magnetics 114 and one or more PHYs 116.

The configurable Ethernet connector 120 and the corresponding connector 112 may comprise a plug and a receptacle, respectively. The configurable connector 120 and the corresponding connector 112 may comprise a receptacle and a plug, respectively. A receptacle may also be referred to as a socket. The configurable connector 120 may comprise a wireless dongle and may be referred to as the wireless dongle 120. The configurable Ethernet connector 120 may be referred to as the connector 120 or the configurable connector 120.

The communication device 110 may comprise suitable logic, circuitry, interfaces and/or code that may be operable to communicate via one or more of any suitable wireless and/or wire-line interface. An exemplary communication device 110 may comprise a router, a switch, a patch panel, a laptop, a portable phone, a media player, a location device, television, set-top-box, a camera and/or gaming device. The communication device 110 may be operable to communicate based on a plurality of communication interfaces, for example, via the corresponding connector 112 within the communication device 110.

In an exemplary embodiment of the invention, the communication device 110 may be a switch in a data center and may be referred to as the switch 110. In this regard, the corresponding connector 112 may be utilized for maintenance of the switch and/or for servicing and/or managing other devices within the data center that may be accessible via the switch 110.

The connector and/or connection interface 130 may comprise a configurable connection platform that may be operable to support optical, wired and/or wireless communication. The connector and/or connection interface 130 may comprise a cable attached to the corresponding connector 112 and/or the configurable connector 120. For example, twisted pair cabling may be attached to the corresponding connector 112. The connector and/or connection interface 130 may also comprise an antenna that may be integrated within a housing of the configurable connector 120, the corresponding connector 112 and/or a within a cable that may be attached to the configurable connector 120 and/or the corresponding connector 112. The connector and/or connection interface 130 may be configured for and/or may be operable to handle one or more functions and/or protocols, for example, wireless communication and/or wired or optical Ethernet communication.

The configurable connector 120 may comprise the copper and/or optical connections 190 that may be operable to transmit and/or receive Ethernet signals to and/or from the corresponding connector 112. The connector and/or connection interface 130 may be operable support a plurality of functions and/or communication protocols concurrently or as configured. In this regard, the connector and/or connection interface 130 may be operable to adjust to different functions and/or protocols. For example, the corresponding connector 112 may be operable to detect when an antenna is coupled or when an Ethernet cable is coupled and may support communication in accordance with the type of connector that is present. In other embodiments of the invention, the connector and/or connection interface 130 may be operable to support optical communication. For example, the connector and/or connection interface 130 may convert between optical and wireless communication. The corresponding connector 112 may comprise an optical interface.

The corresponding connector 112 may be a connector that may be integrated within the communication device 110. The corresponding connector 112 may comprise the magnetics 114 that may comprise, for example, a transformer and copper connection. Alternatively, the corresponding connector 112 may comprise and optical connector. In various embodiments of the invention, the PHY 116 may be operable to communicate via an optical or copper medium and may be integrated within the corresponding connector 112. In other embodiments of the invention, the PHY 116 may be separate from the corresponding connector 112 and may be integrated within the communication device 110. U.S. patent application Ser. No. 61/298,076, filed on Jan. 25, 2010, which is incorporated herein by reference in its entirety, may comprise additional information regarding a connector and/or connection interface comprising an integrated PHY.

The corresponding connector 112 may be operable to couple to the configurable connector 120 based on standardized and/or non-standard specifications. For example, the corresponding connector 112 and the configurable connector 120 may comprise Ethernet connectors. The corresponding connector 112 and/or the connector 120 may comprise a form factor similar to or the same as RJ45 connectors. In various embodiments of the invention, dimensions of the corresponding connector 112 and/or the configurable connector 120 of the connector and/or connection interface 130 may comprise a form factor that may be scaled small enough to fit into a handheld device and/or small enough to enable greater than 48 jacks and/or plugs to fit into a one rack unit (1 RU) face plate, for example a 1RU switch face plate. In this regard, the small scaled connectors may be operable to communicate based on Ethernet standards such as IEEE 802.3 standards and/or variations thereof. Furthermore, in various embodiments of the invention, the connector and/or connection interface 130 may comprise a plurality of connectors such as the corresponding connector 112 that may be ganged together. In this regard, U.S. patent application Ser. No. 61/365,189 filed on Jul. 16, 2010, which is incorporated herein by reference in its entirety, may comprise additional information regarding such a connector and/or connection interface. Moreover, in various embodiments of the invention, the corresponding connector 112 may be operable to supply power to the configurable connector 120, for example, via power over Ethernet.

The corresponding connector 112 may be configurable or may be dedicated to a specific function. For example, the corresponding connector 112 may comprise a service port in a device that may enable management of the device. In another exemplary embodiment of the invention, the corresponding connector 112 may be utilized for data communication. Furthermore, the corresponding connector 112 may be configurable to receive wireless communication, for example, the corresponding connector 112 may function as an antenna port. The corresponding connector 112 may be multifunctional where a plurality of types of communication may operate concurrently. For example, the corresponding connector 112 may receive data input as well as input from an antenna. In various embodiments of the invention, the corresponding connector 112 may be configurable. In this regard, the corresponding connector 112 may comprise an electrical or mechanical switch or detection mechanism to detect whether a cable or an antenna is plugged into the corresponding connector 112.

The configurable connector 120 may comprise suitable logic, circuitry interfaces and/or code that may be operable to communicate based on a plurality of communication interfaces. The configurable connector 120 may comprise the copper and/or optical connections 190 that may be operable to transmit and/or receive Ethernet signals to and/or from the corresponding connector 112. For example, the configurable connector 120 may be operable to communicate with the communication device 110 based on the IEEE 802.3 standard and/or extensions and/or variations thereof. Furthermore, the configurable connector 120 may be operable to communicate wirelessly with one or more of the communication devices 140, 150 and/or with the base station or wireless access point 145. The configurable connector 120 may be operable to communicate wirelessly via the antenna circuitry 124 based on one or more wireless protocols, such as, wireless LAN, wireless telephony and/or GNSS satellite wireless protocols.

In various exemplary embodiments of the invention, the configurable connector 120 may comprise a signal conversion module, such as the wireless access point or signal converter 122. The wireless access point or signal converter 122 may be referred to as the wireless access point 122 or the signal converter 122. The wireless access point or signal converter 122 may be operable to convert wireless signals to copper based Ethernet signals and vice versa. Alternatively, the wireless access point or signal converter 122 may be operable to convert wireless signals to optical Ethernet signals and vice versa. For example, the configurable connector 120 may comprise suitable logic, circuitry, interfaces and/or code that may be operable to receive wireless signals via the antenna 124 and convert the received signals to comply with Ethernet copper and/or Ethernet optical protocols for transmission to the communication device 110 via the corresponding connector 112. In addition, the configurable connector 120 may be operable to receive signals via a copper or optical medium from the communication device 110 and may convert the signals to comply with a wireless protocol and may transmit the wireless signals via the antenna 124. In an exemplary embodiment of the invention, the wireless access point or signal converter 122 may be operable to receive signals that are formatted based on IEEE 802.3 standards and/or variations thereof from the corresponding connector 112 and may convert the received signals based on IEEE 802.11 standards and/or variations thereof, for example, WiFi, and transmit the converted wireless signals via the antenna circuitry 124. Similarly, the wireless access point or signal converter 122 may be operable to receive IEEE 802.11 compliant wireless signals via the antenna 124 and may convert the received wireless signals to IEEE 802.3 compliant signals for communication to the communication device 110 via the corresponding connector 112. Although the described exemplary embodiment is operable to convert IEEE 802.11 wireless signals, the invention is not limited in this regard and may convert any suitable wireless signals, for example, Bluetooth, cellular and/or any personal area, local area and/or wide area network wireless signals to a signal formatted for electrical or optical transmission. As such, the configurable connector 120 may be operable to provide rate matching between a wired protocol signal and a wireless protocol signal and/or between an optical protocol signal and a wireless protocol signal.

In various embodiments of the invention, one or both of the wireless access point or signal converter 122 and the antenna circuitry 124 may be integrated within housing of the configurable connector 120. For example, the housing of the configurable connector 120 may comprise the form factor of an RJ45 connector or a smaller scale Ethernet connector. In other embodiments, the configurable connector 120 may comprise a wireless dongle that may extend beyond or may be larger than the RJ45 connector form factor or the smaller scale Ethernet connector form factor. In this regard, the configurable connector or wireless dongle 120 may comprise wire and/or optical apparatus for mating with a corresponding Ethernet connector 112, the wireless access point or signal converter 122 and the antenna circuitry 124.

The antenna circuitry 124 may comprise an antenna and/or may comprise suitable logic, circuitry, interfaces and/or code that may be operable to process signals that are received and/or transmitted via the antenna circuitry 124. The antenna circuitry 124 may be operable to provide antenna functionality for the wireless access point or signal converter 122 in the configurable connector 120.

In other embodiments of the invention, the configurable connector 120 and the antenna circuitry 124 may be operable to provide one or more antennas for use by the communication device 110 directly. For example, the configurable connector 120, that may comprise a form factor similar to an RJ 45 connector or a smaller scaled form factor, may be configured as an attached antenna for the communication device 110. In this regard, the corresponding connector 112 may comprise an antenna port in the communication device 110. The configurable connector 120 may be operable to provide antenna functionality, for example, when the communication device 110 does not have another antenna. In other exemplary embodiments of the invention, the Ethernet configurable connector 120 and the antenna circuitry 124 may enhance functionality of other antennas (not shown) that may be available in the communication device 110. For example, in instances when the communication device 110 utilizes other attached or integrated antenna circuitry, the antenna circuitry 124 may be utilized in addition to and/or instead of the other antenna circuitry. When other antenna circuitry is utilized with the antenna circuitry 124, the antenna circuitry 124 may be operable to improve the quality of received and/or transmitted wireless signals. For example, the antenna circuitry 124 and the other antenna circuitry may provide spatial or phase diversity. The spatial diversity may enable the communication device 110 to utilize a plurality of multipath versions a signal or to select a preferred signal. In addition, the antenna circuitry 124 may provide polarization diversity, such as, orthogonal polarization. Moreover, the antenna circuitry may provide pattern diversity, for example, for varied azimuth, varied antenna angle and/or varied gain. The antenna circuitry 124 may enable combining signals and/or selecting signals to improve signal to noise ratios (SNR) and/or to better utilize signals that are transmitted and/or received in a multipath environment. For example, when multiple received signals are aligned in phase, signals received via the antenna circuitry 124 may be constructively combined with signals received via another antenna. In other exemplary embodiments of the invention, when signals are received via the antenna circuitry 124 and another antenna utilized by the communication devices 110, the best signal may be selected for use.

The Ethernet configurable connector 120 may provide an extension to other antennas (not shown) that may be integrated within and/or utilized by the communication device 110. In this regard, the antenna circuitry 124 may provide an extended antenna length that may improve absorption of certain wavelength signals. In an exemplary embodiment of the invention, the antenna circuitry 124 may provide an antenna length greater than the length of the communication device 110 or greater than a reasonable length for another style of antenna attachment (not shown). Furthermore, in instances when the communication device 110 comprises and/or utilizes other antennas, the configurable connector 120 and/or the antenna circuitry 124 may provide an additional wireless link. An addition wireless link may be utilized to increase the number of simultaneous wireless connections and/or may be utilized to increase the bandwidth of frequencies that the communication device 110 may transmit and/or receive signals on.

In instances when a plurality of the configurable connector 120 units are ganged together, each configurable connector 120 may have its own antenna circuitry 124 or two or more configurable connector 120 units may share antenna circuitry. The configurable connector 120 may be operable to communicate with the communication device 110 based on Ethernet protocols and/or may communicate wirelessly with one or more of the communication devices 140 and 150, for example. For example, wireless communication with the communication devices 140 and/or 150 may be based on IEEE 802.11 and/or extensions and/or variations thereof, for example, based on WiFi. Moreover, the configurable connector 120 may be operable to wirelessly communicate based on wireless technologies such as, for example, Bluetooth, cellular, satellite and/or Zigbee. The configurable connector 120 may convert wire-line signals to wireless signals and vice versa. In various embodiments of the invention, the configurable connector 120 may be operable to receive power from the corresponding connector 112, for example, via power over Ethernet. U.S. patent application Ser. No. 12/752,065, filed on Mar. 31, 2010, which is incorporated herein by reference in its entirety, describes a connector and/or connection interface that may provide power over Ethernet functionality. Alternatively, in various embodiments of the invention, the configurable connector 120 may comprise the power source 128.

The communication devices 140 and 150 may comprise suitable logic, circuitry, interfaces and/or code that may be operable to communicate wirelessly with the configurable connector 120. The communication devices 140 and/or 150 may be stationary, portable and/or handheld devices. For example, the communication devices 140 and/or 150 may comprise one or more of a mobile phone, a media player, a location device, a television, a set-top-box, a camera and/or a gaming device. In an exemplary embodiment of the invention, the communication devices 140 and 150 may be a laptop and a handheld device respectively and may be referred to as the laptop 140 and the handheld device 150. The laptop 140 and/or handheld device 150 may be operable to communicate wirelessly with the switch 110. For example, a user may be able to service and/or maintain the switch 110 and/or other devices that may be connected with the switch 110 utilizing the laptop 140 and/or the handheld device 150.

In operation, the communication device 110 may be, for example, a switch or a laptop, for example that may comprise the corresponding connector 112. The configurable connector 120 comprising the wireless access point or signal converter 122 may be plugged into the corresponding connector 112. The connector and/or connection interface 130 may comprise the configurable connector 120 and the corresponding connector 112. The connector and/or connection interface 130 may be configured to communicate with the handheld device 150 via the wireless access point 122 and/or the antenna circuitry 124 based on IEEE 802.11 specifications, for example. The corresponding connector 112 and the configurable connector 120 may be configured to communicate based on IEEE 802.3 specifications for example. The wireless access point 122 may be operable to convert wireless signals received from the handheld device 150 to Ethernet signals. For example, the wireless access point 122 may be operable to receive the wireless signals and format the received signals in compliance with IEEE 802.3 standards. The wireless access point 122 may communicate the formatted Ethernet signals to the communication device 110 via the corresponding connector 112. In addition, the wireless access point 122 may receive Ethernet signals formatted in compliance with IEEE 802.3 standards from the communication device 110, may strip the formatting from the signals and may communicate the signals via the antenna circuitry 124 to the communication device 150 for example.

In an exemplary embodiment of the invention, the communication device 110 may be a switch in a large data center that may comprise other interconnected communication equipment such as a plurality of interconnected switches, routers, patch panels and/or broadband modems. The corresponding connector 112 may be, for example, a dedicated service port that may enable a user to service the switch 110 and/or one or more other of the interconnected communication equipment in the data center. For example, the servicing may comprise running tests and/or accessing operations, administration and/or maintenance utilities in the switch and/or other interconnected communication equipment. The configurable connector 120 may be plugged into the corresponding connector 112. In this regard, a user may utilize a wireless communication device, for example, the laptop 140 and/or the handheld device 150 for servicing the switch 110 and/or the other interconnected communication equipment in the data center via the wireless access point 122 in the configurable connector 120. For example, a connection may be made between the handheld device 150 and the wireless access point 122. In addition, an Ethernet connection may be made between the wireless access point 122 and the switch 110. In this manner, the user may access the service capabilities within the switch 110 and/or within the other interconnected communication equipment.

Figure 1B:
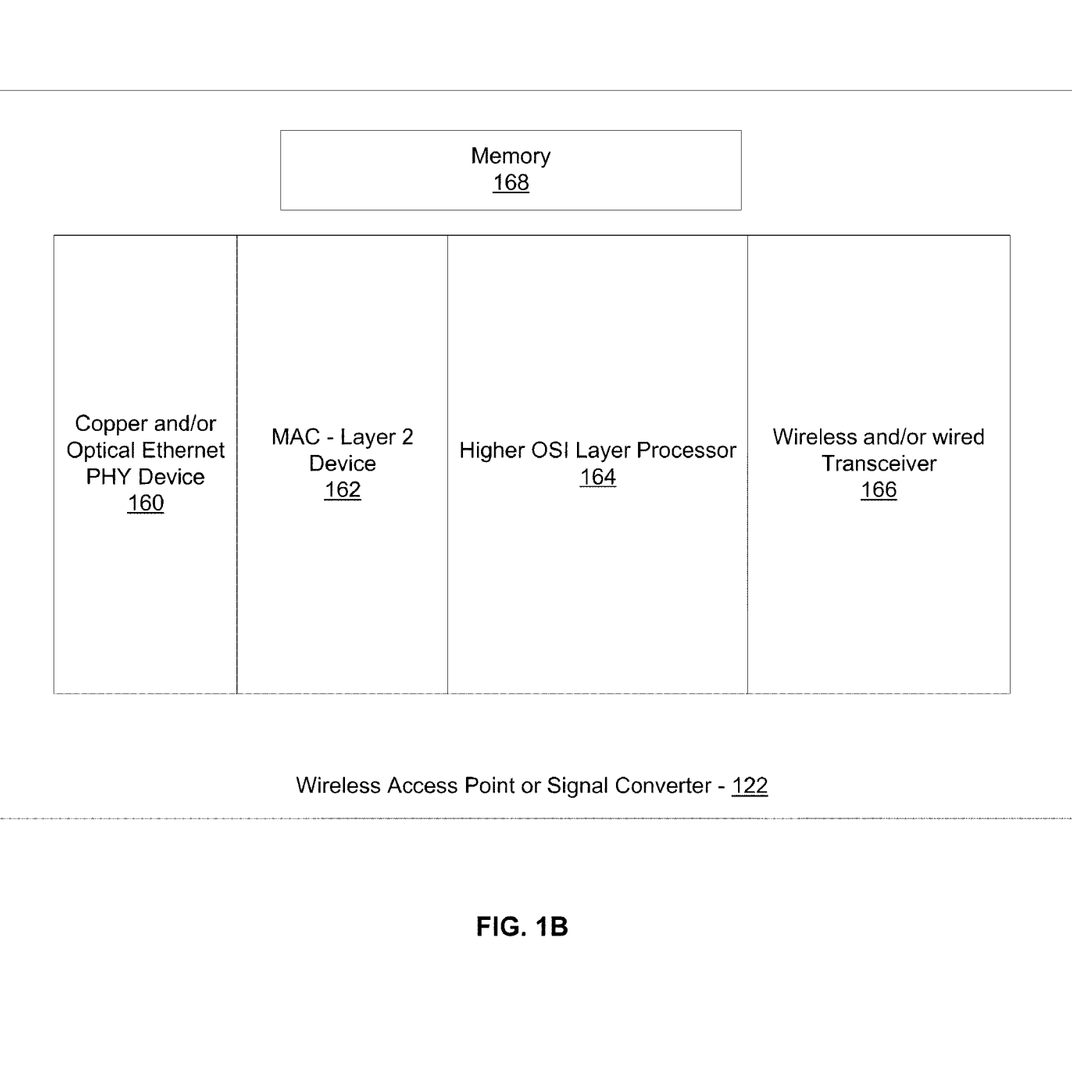
FIG. 1B is a block diagram illustrating an exemplary wireless access point or signal converter, in accordance with an embodiment of the invention.

FIG. 1B is a block diagram illustrating an exemplary wireless access point or signal converter, in accordance with an embodiment of the invention. Referring to FIG. 1B, there is shown the wireless access point or signal converter 122 that may comprise the Ethernet PHY device 160, an OSI layer 2 device 162, a higher OSI layer processor 164, the wireless transceiver 166 and the memory 168.

Various aspects of the wireless access point or signal converter 122 are described with respect to FIG. 1A.

In an exemplary embodiment of the invention, Ethernet PHY device 160 may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In another exemplary embodiment of the invention, the Ethernet PHY device 160 may comprise a backplane PHY capable of operating at one or more standard rates such as 10 Gbps (10 GBASE-KX4, 10 GBASE-KX and/or 10 GBASE-KR); and/or non-standard rates such as 2.5 Gbps and 5 Gbps.

In another exemplary embodiment of the invention, the Ethernet PHY device 160 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the communication device 110 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the communication device 110.

In various embodiments of the invention, the PHY device 160 may comprise suitable logic, circuitry, and/or code that may enable transmission and/or reception at a high(er) data in one direction and transmission and/or reception at a low(er) data rate in the other direction. For example, the communication device 110 may comprise a multimedia server and the communication device 140 may comprise a multimedia client. In this regard, the communication device 110 may transmit multimedia data, for example, to the communication device 140 at high(er) data rates while the communication device 140 may transmit control or auxiliary data associated with the multimedia content at low(er) data rates.

Data transmitted and/or received by the PHY device 160 may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention, the higher layer processor 164 may implement OSI layer 3 and above, the OSI layer 2 device 162 may implement OSI layer 2 and above and the PHY device 160 may implement the operability and/or functionality of OSI layer 1 or the physical layer. In this regard, the PHY device 160 may be referred to as physical layer transmitters and/or receivers, physical layer transceivers, PHY transceivers, PHYceivers, or PHY, for example. The OSI layer 2 device 162 may be referred to as a media access control device (MAC).

Various embodiments of the invention may comprise the higher OSI layer processor 164 in the wireless access point or signal converter 122. The higher OSI layer processor 164 may comprise suitable logic, circuitry, and/or code that may enable operability and/or functionality of the five highest functional OSI layers for data packets that are to be transmitted to the corresponding connector 112 and/or the communication device 110. Since each layer in the OSI model provides a service to the immediately higher interfacing layer, the OSI layer 2 device 162 may provide the necessary services to the higher OSI layer processor 164 to ensure that packets are suitably formatted and communicated to the PHY device 160. During transmission, each layer may add its own header to the data passed on from the interfacing layer above it. However, during reception, a compatible device having a similar OSI stack may strip off the headers as the message passes from the lower layers up to the higher layers.

The PHY device 160 may be configured to handle physical layer requirements, which comprise, but are not limited to, packetization, data transfer and serialization/deserialization (SERDES), in instances where such an operation is required. Data packets received by the PHY device 160 from the OSI layer 2 device 162, may include data and header information for each of the above six functional layers that may be implemented in the wireless access point or signal converter 122. The PHY device 160 may be configured to encode data packets that are to be transmitted to the corresponding connector 112 and/or to decode data packets received from the corresponding connector 112.

The OSI layer 2 device 162 may comprise suitable logic, circuitry, and/or code that may enable handling of data link layer, layer 2, operability and/or functionality in the wireless access point or signal converter 122. The MAC device 162 may be configured to implement Ethernet protocols, such as those based on the IEEE 802.3 standard and/or variations and/or extensions thereof, for example. Notwithstanding, the invention is not limited in this regard.

The OSI layer 2 device 162 may communicate with the PHY device 160 based on protocol and/or link management signals via a multi-rate capable interface and/or a media independent interface (MII), for example. The OSI layer 2 device 162 may communicate with the PHY device 160 via parallel and/or serial links, for example, via an MII, XGMII, SGMII, XAUI or XFI interface. The OSI layer 2 device 162 may communicate with the higher OSI layer processing device 164 via a bus controller interface which may correspond to PCI or PCI-X interfaces. Notwithstanding, the invention is not limited in this regard.

The higher OSI layer processor 164 may comprise suitable logic, circuitry, interfaces and/or code that may be operable to manage and/or control operations of access point or signal converter 122 components, such as the Ethernet PHY device 160, the OSI layer 2 device 162 and the wireless transceiver 166, for example. In addition, the higher OSI layer processor 164 may be operable to activate or deactivate one or more radios in the wireless transceiver 166 as a needed for communicating information. In various embodiments of the invention, the higher OSI layer processor 164 may be operable to manage execution of instructions that may be stored in the memory 168. The higher OSI layer processor 164 may be operable to manage access to one or more wireless devices or to one or more wireless networks via the wireless transceiver 168. For example, the higher OSI layer processor 164 may manage cellular and/or WiFi access to the base station or access point 145, a Bluetooth connection with the communication device 140 and/or a voice connection with the communication device 150. The higher OSI layer processor 164 may be operable to access one or more wired or optical devices and/or networks via the Ethernet PHY 160. The higher OSI layer processor 164 may be operable to store information regarding interactions with wireless, wired or optical devices in the memory 168. In various embodiments of the invention, the higher OSI layer processor 164 may be configured to manage power and/or power over Ethernet (POE) utilization in the access point or signal converter 122 and/or the configurable connector 120.

The memory 168 may comprise suitable logic, circuitry, interfaces and/or code that may be operable to store information such as executable instructions and data that may be utilized by the higher OSI layer processor 164 and/or other device components such as, for example, the wireless transceiver 166, the Ethernet PHY 160 and/or the OSI layer 2 device 162. The memory 168 may comprise RAM, ROM, low latency nonvolatile memory such as flash memory and/or other suitable electronic data storage.

The wireless transceiver 166 may comprise suitable logic, circuitry, interfaces and/or code that may be operable to communicate based on one or more radio access protocols, for example, CDMA, GSM, UMTS, LTE, WiMAX, WiFi, Bluetooth and/or Zigbee, although the invention is not limited in this regard. For example, the wireless transceiver 166 may be operable to communicate with the communication devices 140 or 150 or the wireless base station 145, for example. The wireless receiver 166 may be communicatively coupled with the antenna circuitry 124 and the higher OSI layer processor 164. In various embodiments of the invention, the configurable connector 120 may comprise a plurality of such wireless transceivers. For example, the configurable connector 120 may comprise a GNSS receiver (not shown) that may comprise suitable logic, circuitry, interfaces and/or code that may be operable to detect and receive GNSS signals from GNSS satellites and may be operable to utilize the received GNSS signals to calculate location information for the configurable connector 120 and/or the communication device 110, for example.

In operation, the access point or signal converter 122 may be configured to communicate with one or more of the communication devices 140, 150 and/or the base station or access point 145 via the wireless transceiver 166 and/or the antenna circuitry 124. In addition, the access point or signal converter 122 may be configured to communicate with the communication device 110 via the layer 2 device 162 and the Ethernet PHY device 160. The higher OSI layer processor 164 may be operable to control operations in the access point or signal converter 122, for example, may control rate matching between the wireless transceiver 166 and the Ethernet PHY 160. The OSI layer 2 device 162 may be operable to read signals that are received via the wireless transceiver 166 from one or more of the communication devices 140, 150 and/or the wireless base station 145, and may format the signals in compliance with IEEE 802.3 standards and/or variations thereof. The formatted signals may be communicated to the communication device 110 via the Ethernet PHY device 160 and the corresponding connector 112. In addition, wired or optical Ethernet signals may be received from the communication device 110 via the corresponding connector 112 and the Ethernet PHY device 160. The wired or optical signals may be received by the OSI layer 2 device 162 which may strip IEEE 802.3 standards compliant formatting from the signals. The higher OSI layer processor 160 may control communication of the signals to one or more of the communication devices 140, 150 and/or the base station 145 via the wireless transceiver 166 in accordance with a suitable wireless communication protocol, for example, Bluetooth or an IEEE 802.11 standards protocol. In instances when the configurable connector 120 may communicate with the communication devices 140, 150 and/or the base station 145 based on IEEE 802.11 standards, the configurable connector 120, may be operable to convert signals formatted in accordance with IEEE 802.3 standards to signals formatted in accordance with IEEE 802.11 standards and vice versa from IEEE 802.11 to IEEE 802.3.

Figure 2:
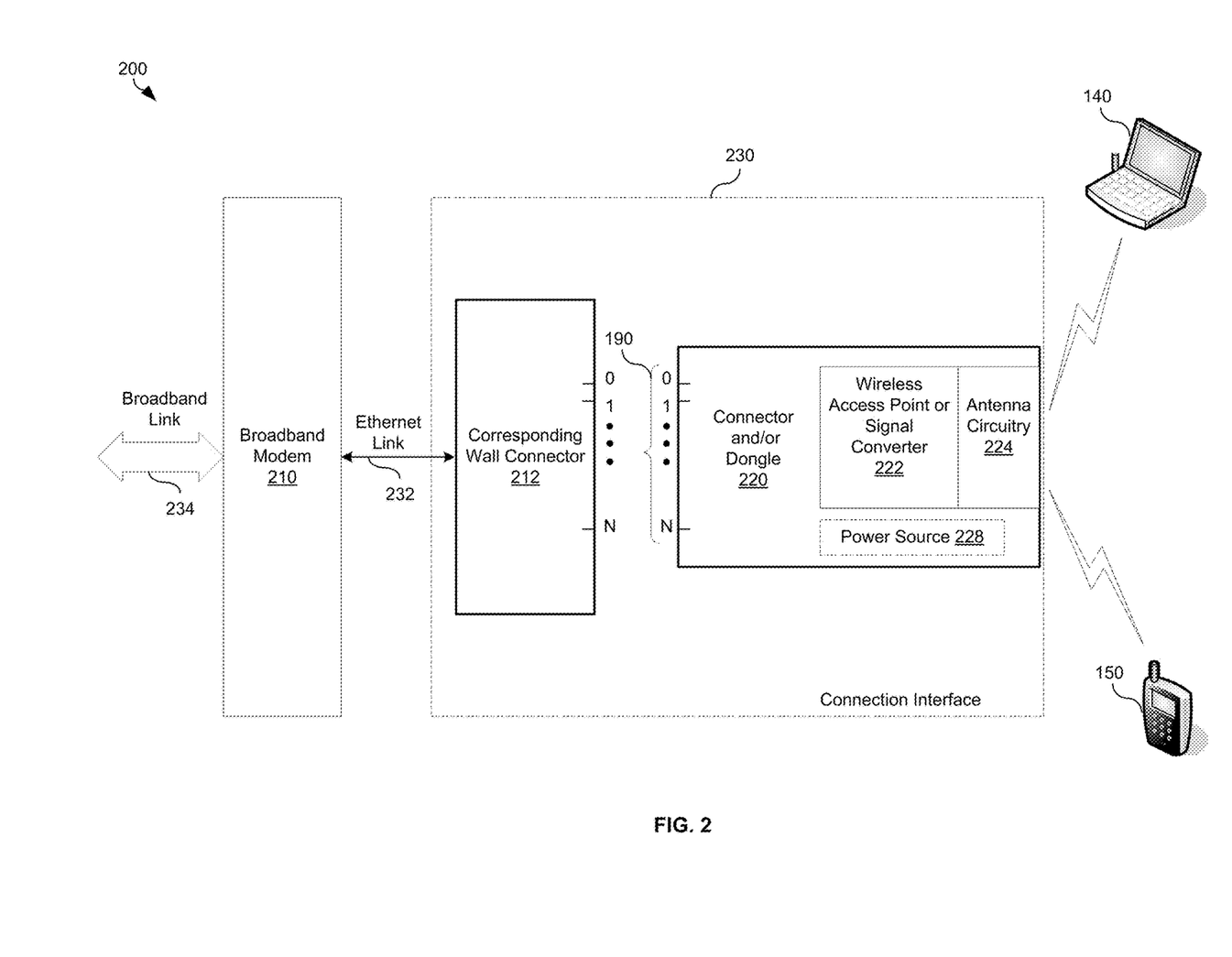
FIG. 2 is a block diagram that illustrates an exemplary connector and/or connection interface comprising a wireless access point that may communicate via a wired network, in accordance with an embodiment of the invention.

FIG. 2 is a block diagram that illustrates an exemplary connector and/or connection interface comprising a wireless access point that may communicate via a wired network, in accordance with an embodiment of the invention. Referring to FIG. 2, there is shown, a communication system 200 that comprises a connector and/or connection interface 230, a configurable Ethernet connector 220, the copper and/or optical connections 190, a wireless access point or signal converter 222, antenna circuitry 224, a power source 228 and a corresponding wall connector 212. In addition, there is shown a broadband link 234, a broadband modem 210 and a communication link 232. The communication devices 140 and 150 are also shown.

The connector and/or connection interface 230 may be similar and/or substantially the same as the connector and/or connection interface 130 described with respect to FIG. 1. The connector and/or connection interface 230 may comprise the connector 220 and/or the corresponding wall connector 212.

The configurable connector 220, the wireless access point or signal converter 222, the antenna circuitry 224 and the power source 228 may be similar and/or substantially the same as the configurable connector 120, the wireless access point or signal converter 122, the power source 128 and the antenna circuitry 124 described with respect to FIG. 1. The configurable Ethernet connector 220 may be referred to as the connector 220 or the configurable connector 220. Furthermore, the communication devices 140 and 150 are described with respect to FIG. 1.

Various aspects of the corresponding wall connector 212 may be similar and/or substantially the same as the corresponding connector 112. Notwithstanding, the corresponding wall connector 212 may be installed in a wall and/or in a patch panel, for example. The corresponding wall connector 212 may comprise suitable logic, circuitry, interfaces and/or code that are operable to provide power over Ethernet to the connector 220. Furthermore, the corresponding wall connector 112 may be operable to couple to the connector 220 based on standardized and/or non-standard specifications. For example, based on Ethernet standards and/or extensions and/or variations thereof. In this regard, the corresponding wall connector 212 and the connector 220 may comprise Ethernet connectors in the connector and/or connection interface 230. In various embodiments of the invention, the dimensions of the corresponding wall connector 212 and/or the connector 220 may be on a scale that is small enough to enable greater than 48 jacks and/or plugs to fit into a one rack unit face plate. Furthermore, in various embodiments of the invention, the connector and/or connection interface 220 may comprise a plurality of connectors such as the corresponding wall connector 212 that may be ganged together. The corresponding wall connector 212 may be operable to communicate via the link 232. In this regard, the link 232 may comprise a twisted pair cable. For example, the link 232 may be an Ethernet link. In various embodiments of the invention, the link 232 may comprise one or more patch panels between the corresponding wall connector 212 and the broadband modem 234 for example.

The broadband modem 210 may comprise suitable logic, circuitry, interfaces and/or code that may be operable to communicate information to the wireless access point or signal converter 222 via the corresponding wall connector 212. Furthermore, the broadband modem 212 may be operable to provide Internet access via the broadband link 234 to one or more users of the communication devices 140 and 150 that may be communicatively coupled via the wireless access point or signal converter 222. Although the communication system 200 comprises a broadband modem connected to the corresponding wall connector 212, the invention is not so limited. For example, the corresponding wall connector 212 may be connected to any suitable wire-line, optical and/or wireless network and/or network device.

In operation, a user of the laptop 140, for example, may wish to access the Internet and/or an intranet, for example, from a home, office and/or any other site or facility. In this regard, the home, office and/or other site and/or facility may comprise Internet and/or intranet access, for example, may be communicatively coupled to the corresponding wall connector 212 and/or the modem 210, for example. The connector 220 may be coupled to the corresponding wall connector 212. The user may initiate access to the Internet, for example, and a wireless connection may be made between the laptop 140 and the wireless access point or signal converter 222 based on, for example, IEEE 802.11 standards. Furthermore, the laptop 140 may be operable to establish an IP connection to an Internet device via the antenna circuitry 234 and the wireless access point or signal converter 222 in the connector 220, the corresponding wall connector 212, the Ethernet link 232, the broadband modem 210 and the broadband link 234.

Figure 3:
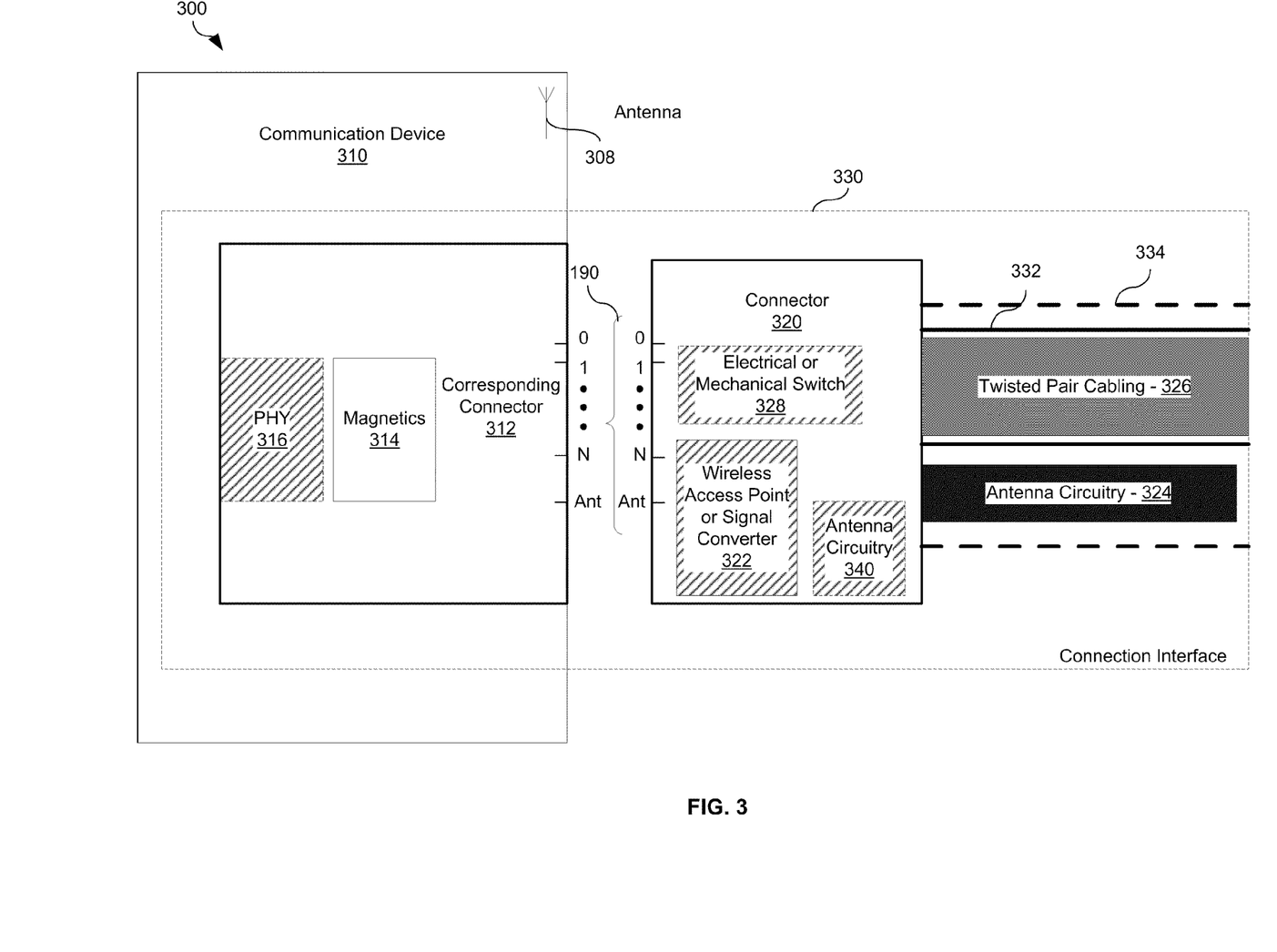
FIG. 3 is a block diagram that illustrates an exemplary connector and/or connection interface that comprises a coupled antenna, in accordance with an embodiment of the invention.

FIG. 3 is a block diagram that illustrates an exemplary connector and/or connection interface that comprises a coupled antenna, in accordance with an embodiment of the invention. Referring to FIG. 3, there is shown a communication system 300 that may comprise a communication device 310, an antenna 308 and a connector and/or connection interface 330. The connector and/or connection interface 330 may comprise a configurable Ethernet connector 320, the copper and/or optical connections 190, an antenna circuitry 324, a cable 326, cable shielding 332, antenna circuitry 340, a wireless access point or signal converter 322, an electrical or mechanical switch 328 and an non-conducting jacket 334. In addition, the connector and/or connection interface 330 may comprise a corresponding connector 312, magnetics 314 and one or more PHYs 316.

Aspects of the connector and/or connection interface 330, the configurable connector 320, the wireless access point or signal converter 322 and/or the corresponding connector 312 may be similar and/or substantially the same as the connector and/or connection interface 130, the configurable connector 120, the wireless access point or signal converter 122 and/or the corresponding connector 112, respectively. The configurable Ethernet connector 320 may be referred to as the connector 320 or the configurable connector 320.

The connector and/or connection interface 330 may comprise suitable logic, circuitry, interfaces and/or that may be operable to support wire-line and/or wireless communication between two or more communication devices, for example, comprising the communication device 310. In addition, various aspects of the connector and/or connection interface 330 may be similar and/or substantially the same as the connector and/or connection interface 130 and/or the connector and/or connection interface 230 and/or a combination thereof. For example, the connector and/or connection interface 330 may be operable to convert between wired and wireless communication protocols, between optical and wireless communication protocols and between optical and wired communication protocols. Furthermore the connector and/or connection interface 330 may be operable to transmit and received wired Ethernet signals in both directions. In an exemplary embodiment of the invention, the wireless access point or signal converter 322 in the connector 320 may be operable to convert signals formatted in accordance with IEEE 802.3 standards to signals formatted in accordance with IEEE 802.11 standards and vice versa from IEEE 802.11 to IEEE 802.3. Notwithstanding, the invention is not limited with regard to the type of signal protocols that may be handled by the connectors 120, 220 and/or 320. Although the connector and/or connection interface 330 shown in FIG. 3 comprises wired and/or wireless technologies, the invention is not so limited. For example, various embodiments of the invention may support wired, wireless and/or optical technologies. The connector and/or connection interface 330 may comprise the corresponding connector 312, the connector 320, the cable 326, the antenna circuitry 324 and/or the antenna circuitry 340.

The communication device 310 may comprise suitable logic, circuitry, interfaces and/or code that may comprise and/or may be coupled to one or more connection interfaces 330. Accordingly, the communication device 310 may comprise one or more corresponding connectors 312 and/or may be communicatively coupled to the connector 320. In this regard, the communication device 310 may be operable to communicate via one or more wire-line and/or wireless interfaces. In an exemplary embodiment of the invention, the communication device 310 may be a wireless access point; however, the invention is not so limited. For example, the communication device 310 may be operable to communicate wirelessly via the connector and/or connection interface 330 based on one or more variations and/or extensions of IEEE 802.11 and/or may be operable to communicate based on one or more other wireless technologies, for example, Bluetooth, cellular, satellite and/or Zigbee via the connector and/or connection interface 330. Moreover, the communication device 310 may be capable of wired communication via the connector and/or connection interface 330, for example, Ethernet communication based on one or more variations and/or extensions of 802.3. In various embodiments of the invention, the communication device may comprise the antenna 308 that may be utilized for wireless communications.

Various aspects of the corresponding connector 312 may be similar and/or substantially the same as the corresponding connector 112 and/or the corresponding wall connector 212 and/or a combination thereof. The corresponding connector 312 may comprise suitable logic, circuitry, interfaces and/or code that may be operable to couple to the connector 320 and/or to support wireless and/or wire-line communication via the connector 320. In this regard, the corresponding connector 312 may comprise physical coupling for data communication, system management access and/or for an antenna port, for example. For example, the connector 320 may be one or more of an Ethernet connector, a system management connector and/or may be an antenna connector. The corresponding connector 312 may comprise the magnetics 314 that may comprise a transducer. In various embodiments of the invention, the corresponding connector 312 may comprise one or more PHYs, for example, the PHY 316. In this regard, the corresponding connector 312 may offload PHY functionality from the communication device 310 and may simplify electronic design, reduce noise and/or reduce complexity within the communication device 310.

The corresponding connector 312 may be configurable or may be dedicated to a specific function. For example, the corresponding connector 312 may comprise a service port in a device that may enable management of the device. In another exemplary embodiment of the invention, the corresponding connector 312 may be utilized for data communication. Furthermore, the corresponding connector 312 may be configurable to receive wireless communication, for example, the corresponding connector 312 may function as an antenna port. The corresponding connector 312 may be sequentially and/or concurrently multifunctional where a plurality of types of communication protocols may operate. For example, the corresponding connector 312 may receive input via the twisted pair cabling 326 as well as input from an antenna circuitry 340 and/or 324. In various embodiments of the invention, the corresponding connector 312 may be configurable. The corresponding connector 312 may comprise a electrical or mechanical switch 328 or detection mechanism to detect whether a cable and/or an antenna is plugged into the corresponding connector, for example.

Various aspects of the connector 320 may be similar and/or substantially the same as the connector 120 and/or the corresponding connector 112 and/or a combination thereof. The connector 320 may comprise suitable logic, circuitry and/or code that may be operable to support wired and/or wireless communication. The connector 320 may be an Ethernet connector and may be coupled to the corresponding connector 312. In this regard, the connector 320 may support wired communication protocols, for example, Ethernet communication protocols. In addition, the connector 320 may be coupled to the cable 326. The connector 320 may comprise the antenna circuitry 340. The antenna circuitry 340 may comprise suitable logic, circuitry, interfaces and/or code that may be operable to terminate an antenna and or improve characteristics of transmitted and/or received signals. For example the antenna circuitry 340 may comprise a transducer and or analog and/or digital signal processing (DSP) technology. Moreover, the antenna circuitry 340 that may be integrated within housing of the connector 320, may comprise an antenna or may terminate the external antenna circuitry 324 that may be integrated within the cable 326.

The connector 320 may be configurable to operate as an antenna for the communication device 310 and may transmit and/or receive wireless communication via the antenna circuitry 340 and/or via the antenna circuitry 324. The connector 320 may be sequentially and/or concurrently multifunctional where a plurality of types of communication protocols may operate. For example, the connector 320 may communicate via the twisted pair cabling 326 as well as via one or more of the antenna circuitry 340 and 324. In various embodiments of the invention, the connector 320 may be configurable. The connector 320 may comprise the electrical or mechanical switch 328 that may be configurable to select input and/or output via the antenna circuitry 340, the antenna circuitry 340 and/or the twisted pair cabling 326, for example. The switch 328 may comprise a detection mechanism to determine whether the twisted pair cabling 326, the antenna 340 and/or the antenna circuitry 324 may be utilized for communication. The antenna circuitry 324 may comprise a specified length that may be operable to communicate suitable wireless signals. For example, the antenna circuitry may comprise a length that is a fraction or a multiple of a wavelength of wireless signals such as Bluetooth, WLAN, cellular or PCS signals that may be communicated by the connector 320. In various exemplary embodiments of the invention, the connector 320 may be operable to provide a direct antenna connection from one or both of the antenna circuitry 324 and 340 to the communication device 110 via the corresponding connector 312. Alternatively, the wireless access point or signal converter 322 may be operable to parse and/or format signals received via the antenna circuitry 324 or 340 to, for example, an Ethernet format prior to communicating the signals to the communication device 310 and vice versa.

The cable 326 may be, for example, a twisted pair cable which may comprise the shielding 332 and/or the non-conducting jacket 334. In various embodiments of the invention, the cable 326 may comprise the antenna circuitry 324 which may run outside of the shielding 332. The antenna circuitry 324 may be integrated within and/or without the non-conductive jacket 334. The antenna circuitry may terminate in the connector 320.

In various embodiments of the invention, the communication device 310 may not comprise any internal antenna and may utilize antenna circuitry 324 and/or antenna circuitry 340 in the connector 320 to provide antenna functionality. In instances when the communication device 310 comprises one or more antennas, for example, the antenna 308, the antenna circuitry 324 and/or the antenna circuitry 340 may be utilized to extend and/or enhance signals that are communicated via the antenna 308. For example, the antenna circuitry 324 and/or the antenna circuitry 340 may handle receive and/or transmit diversity signals.

In operation, the communication device 310 may comprise, for example, a wireless access point or a laptop. The communication device 310 may comprise one or more of corresponding connectors such as the corresponding connector 312. The connector 320 may be coupled to the corresponding connector 312. The connector 320 may comprise antenna circuitry 340. The connector 320 may be coupled to the cable 326 and/or may be coupled to the antenna circuitry 324.

In an exemplary embodiment of the invention, the communication device 310 may be operable to communicate with an upstream network device, for example, via the cable 326 and may communicate with a downstream wireless device, for example, the handheld device 150 shown in FIG. 1, via the antenna circuitry 324.

In another exemplary embodiment of the invention, the connector 320 may comprise an antenna integrated within a housing of the connector, for example, in the antenna circuitry 340. The connector 320 may or may not comprise the cable 326 and/or the antenna circuitry 324. In this instance the connector 320 with integrated antenna circuitry 324 may be coupled to the communication device 310 and may be utilized for wireless communication based on one or more wireless technologies, for example, based on cellular, Bluetooth and/or IEEE 802.11.

Figure 4:
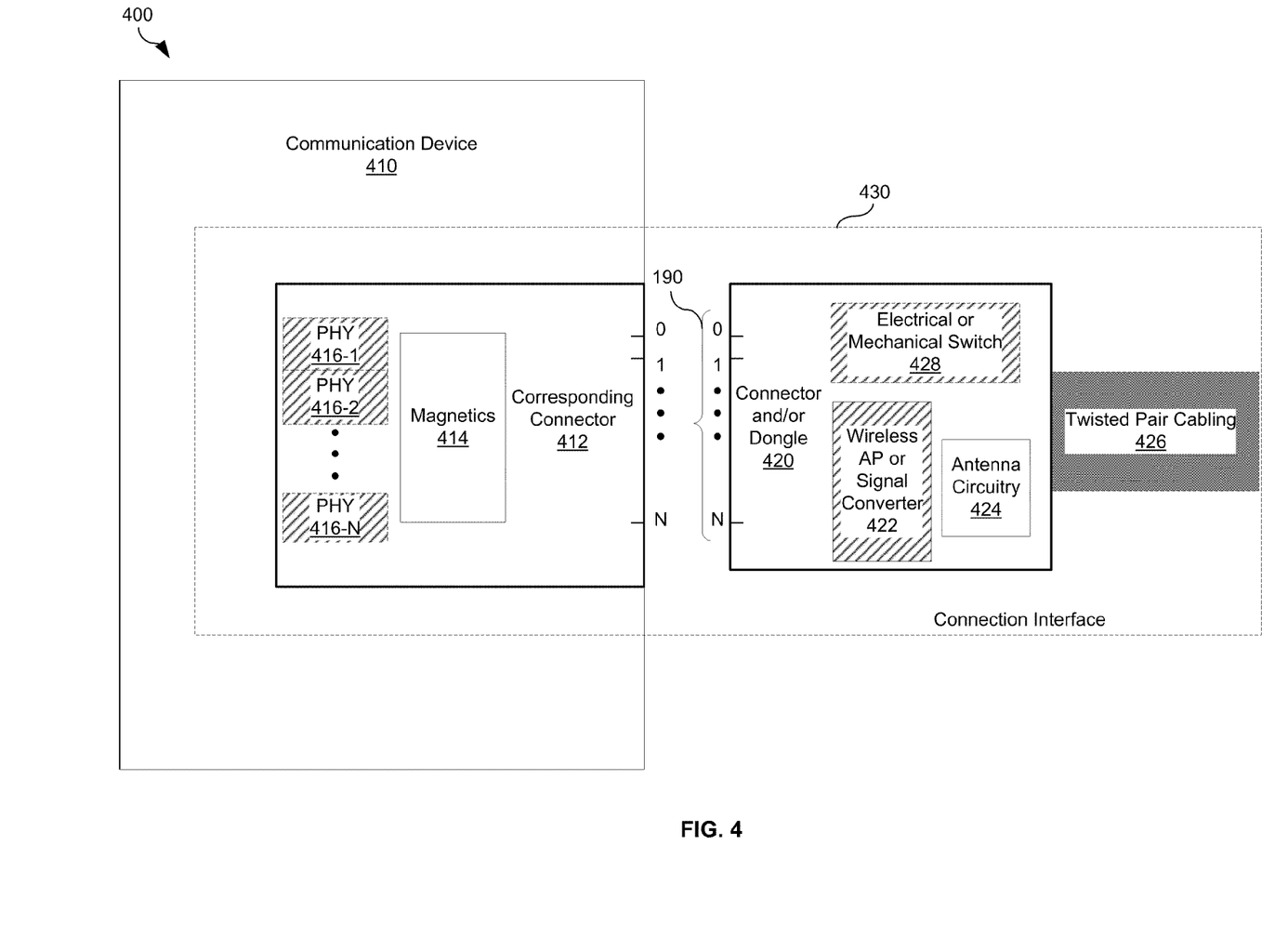
FIG. 4 is a block diagram that illustrates an exemplary configurable connector and/or connection interface capable of wireless and/or wire-line communication via a plurality of types of PHY devices, in accordance with an embodiment of the invention.

FIG. 4 is a block diagram that illustrates an exemplary configurable connector and/or connection interface capable of wireless and/or wire-line communication via a plurality of types of PHY devices, in accordance with an embodiment of the invention. Referring to FIG. 4, there is shown, the communication system 400 that may comprise a communication device 410 and a connector and/or connection interface 430. The connector and/or connection interface 430 may comprise a configurable Ethernet connector 420, the copper and/or optical connections 190, antenna circuitry 424, an wireless access point or signal converter 422, an electrical or mechanical switch 428, a cable 426, a corresponding connector 412, magnetics 414 and a plurality of PHY devices $416_1$, $416_2$, ..., $416_N$. One or more of the PHY devices $416_1$, $416_2$, ..., $416_N$ may be referred to as the PHY devices 416.

The communication device 410 may comprise suitable logic, circuitry, interfaces and/or code that may be operable to communicate based one or more types of wireless and/or wire-line technology. For example, the communication device 410 may be operable to communicate based on IEEE 802.3 and/or variations and extensions there of. The communication device 410 may be operable to communicate based on, for example, one or more of IEEE 802.11, cellular, Bluetooth, satellite and Zigbee. In various exemplary embodiments of the invention, the communication device 410 may comprise a laptop, a handheld phone, a media player, a camera, a gaming device, a location device and/or any suitable combination of devices. The communication device 410 may comprise the corresponding connector 412 and may utilize one or more PHY devices that may be integrated within the corresponding connector 412. In an exemplary embodiment of the invention, the communication device may be a laptop that may be operable to communicate based on a plurality of communication protocols via a plurality of corresponding PHY devices that may be integrated within the corresponding connector 412. Moreover, connectors similar to the corresponding connector 412 may be ganged within the communication device 410.

The connector and/or connection interface 430 may comprise aspects of all or a portion of the connector and/or connection interfaces 130, 230 and 330. The connector and/or connection interface 430 may comprise suitable logic, circuitry, interfaces and/or that may be operable to support communication based on a plurality of types of wire-line and/or wireless communication. In addition, the connector and/or connection interface 430 may be operable to convert between wired and wireless communication protocols, for example, 802.3 and 802.11.

The corresponding connector 412 may comprise various aspects of the corresponding connectors 312, 212 and 112. The corresponding connector 412 may comprise the magnetics 416. Moreover, the corresponding connector 412 may comprise a plurality of PHY devices $416_1, 416_2, \ldots, 416_N$. In various embodiments of the invention, the plurality of PHY devices $416_1, 416_2, \ldots, 416_N$ may be integrated on a single chip within the corresponding connector. The PHY devices $416_1, 416_2, \ldots, 416_N$ may comprise a single type of PHY device or may comprise a plurality of types. For example, the PHY devices may be operable to support one or more of IEEE 802.3, IEEE 802.11, cellular, Bluetooth, satellite communications, Zigbee and extensions and/or variations thereof. In addition, the corresponding connector 412 may be operable to couple to the configurable Ethernet connector 420. In this regard, the corresponding connector 412 may be a dedicated service port, which may be operable to support data communication and/or may terminate an antenna connection with the connector 420 which may comprise a wireless dongle. In various embodiments of the invention, the corresponding connector 412 may be operable to sense the communication protocol and/or communication technology capabilities of the connector 420. In this regard, the corresponding connector 412 may be configured, may select a PHY device and/or may process signals in accordance with capabilities of the coupled connector 420 and/or based on signals received by the connector 420.

The configurable Ethernet connector 420 may comprise aspects that are similar and/or substantially the same as one or more of the configurable Ethernet connectors 320, 220 and 120. The configurable Ethernet connector 420 may be referred to as the connector 420 or the configurable connector 420. The connector 420 may comprise a wireless dongle or may comprise an antenna within the housing of the connector 420. The connector 420 may be an Ethernet connector and may be operable to communicate in accordance with one or more Ethernet communication protocols, for example, IEEE 802.3. The connector 420 may comprise a signal converter 428 for conversion of wireless signals to wire-line signals and/or for conversion from wire-line signals to wireless signals. For example, the signal converter 428 in the connector 420 may be operable to convert signals received from the communication device 410 that may be formatted based on IEEE 802.3 standards and/or variations thereof, to signals formatted based on IEEE 802.11 standards and/or variations thereof. The converted wireless signals may be communicated via the antenna circuitry 424. Similarly, the signal converter 428 in the connector 420 may be operable to convert wireless signals received via the antenna 424 that may be communicated based on IEEE 802.11, cellular, Bluetooth and/or other wireless standards, to signals formatted in based on IEEE 802.3 standards and/or variations thereof. The connector 420 may be operable to communicate the converted signals to the communication device 410 via the corresponding connector 412. Moreover, in various embodiments of the invention, the connector 420 may comprise a wireless access point.

Various embodiments of the invention may comprise the cable 426 which may be coupled to the connector 420. The cable 426 may comprise twisted pair wires and/or may be similar and/or substantially the same as the cable 326. In this regard, various embodiments of the invention the cable 426 may comprise an antenna similar to the antenna 324 shown in FIG. 3. The connector 420 and/or the cable 426 may support wireless and/or wire-line communication via one or more of the plurality of PHY devices $416_1, 416_2, \ldots, 416_N$. For example, the connector 420 and/or the cable 426 may be operable to support one or more of IEEE 802.3, IEEE 802.11, cellular, Bluetooth, satellite communications, Zigbee and extensions and/or variations thereof.

In operation, the communication device 410 may be accessed based on a plurality of communication protocols via the corresponding connector 412 and/or via the plurality of PHY devices $416_1, 416_2, \ldots, 416_N$. In this regard, the connector and/or connection interface 430 may be operable to communicatively couple a plurality of different types of wireless and/or wire-line devices that may be operable to communicate based on a plurality of different communication protocols with the communication device 410. The communication device 410 may comprise one or more connectors such as the corresponding connector 412 that may be ganged together in some instances. In instances when the communication device 410 comprises a plurality of connectors such as the corresponding connector 412 that may have one or more types of PHY devices in common, the corresponding connectors 412 may be utilized interchangeably. For example, a plurality of connectors similar to the connector 420 and/or to the connector 320 may be coupled to the communication device 410 concurrently or sequentially. A connector that may be attached to the Ethernet cable 426 may be connected to one of the corresponding connectors 412 and a connector comprising antenna circuitry 424 may be coupled to another one of the corresponding connectors 412. The connector 320 that may be coupled to the cable 326 and the antenna circuitry 324 described with respect to FIG. 3, may also be coupled to one of the corresponding connectors 412. In this manner, the communication device 410 may be operable to communicate based on an Ethernet protocol via the cable 326, for example, and may concurrently and/or sequentially communicate based on one or wireless protocols via the antenna circuitry 324 that may be integrated within the cable 326. The connector 426 may also be connected to one of the corresponding connectors 412 that may comprise an antenna within the integrated antenna circuitry 424. The corresponding connectors 412 may be operable to detect which type of signal protocol is utilized by the connector 420 or the connector 320. In this manner, the communication device 410 may be operable to communicate based on one or more communication technologies supported by the plurality of PHY devices 416 via the corresponding connector 412 and the connector 420.

Figure 5:
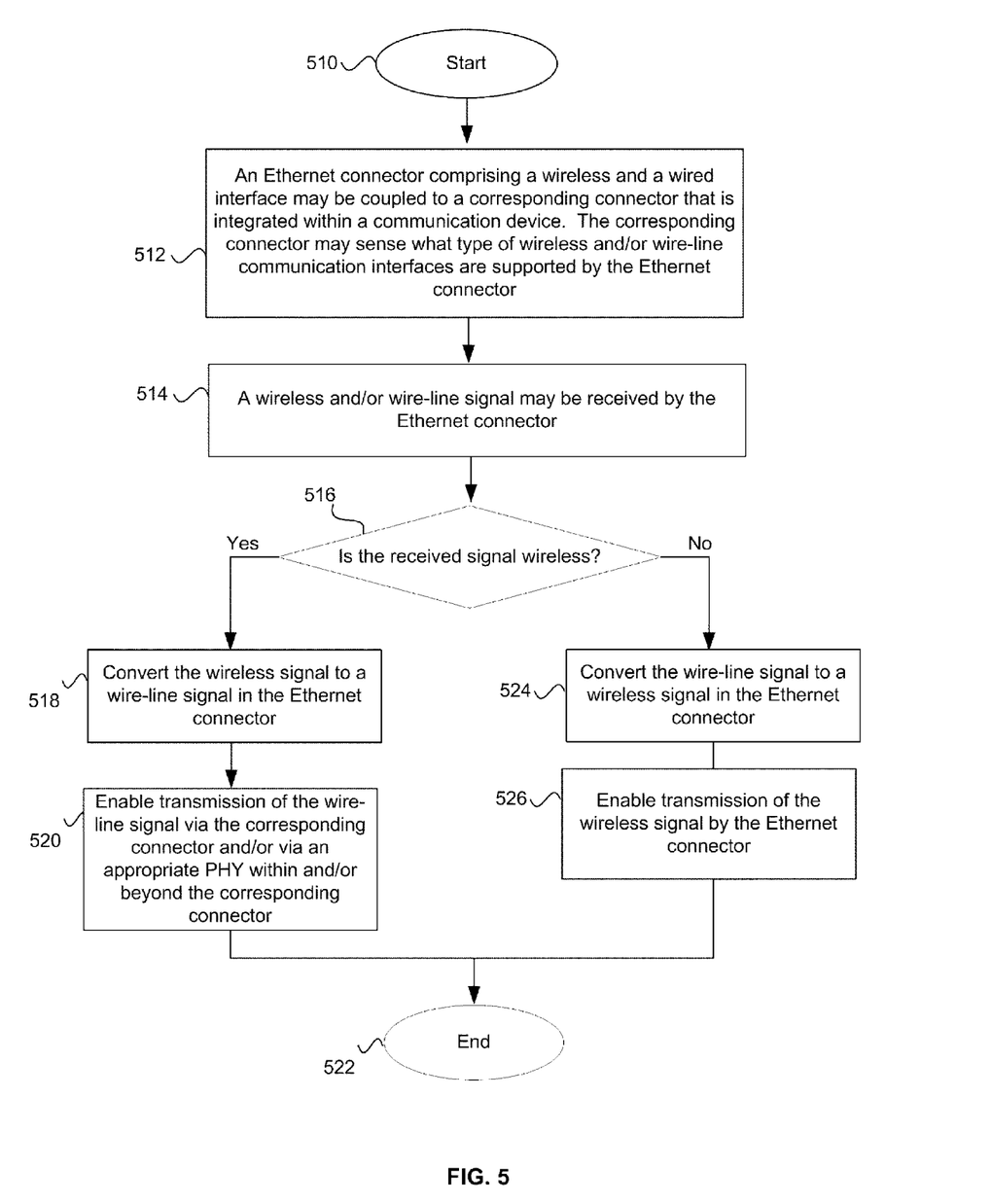
FIG. 5 is a flow chart illustrating exemplary steps for communicating via a connector and/or connection interface capable of wireless and/or wire-line communication, in accordance with an embodiment of the invention.

FIG. 5 is a flow chart illustrating exemplary steps for communicating via a connector and/or connection interface capable of wireless and/or wire-line communication, in accordance with an embodiment of the invention. Referring to FIG. 5, the exemplary steps may begin with step 510. In step 512, an Ethernet connector, for example, the connector 420 may be coupled to the corresponding connector 412 that is integrated within the communication device 410. The corresponding connector 412 may sense what type of wireless and/or wire-line communication interfaces are supported by the Ethernet connector 420. In step 514, a wireless and/or wire-line signal may be received by the Ethernet connector 420. In step 516, if the signal is received via a wireless medium, the exemplary steps may proceed to step 518. In step 518, the wireless signal may be converted to a wire-line signal in the Ethernet connector 420. In step 520, transmission of the wire-line signal may be enabled via the corresponding connector 412 and/or via an appropriate PHY 416 within and/or beyond the corresponding connector 416. In step 516, if the signal is received via a wire-line medium, proceed to step 524. In step 524, the wire-line signal may be converted to a wireless signal in the Ethernet connector 420. In step 526, the wireless signal may be transmitted by the Ethernet connector 420.

In an embodiment of the invention, a configurable Ethernet connector for example, one of the Ethernet connectors 120, 220, 320 and 420, comprises a first interface and a second interface. The first interface may comprise a wired interface and a wireless interface that are configurable to communicate corresponding wired and wireless signals. The second interface may comprise a wired interface and an optical interface that are configurable to communicate corresponding wired and optical signals. A signal may be received via the first interface or the second interface. In instances when the received signal comprises a wireless signal that is received via the first interface, the received wireless signal may be converted to one of a wired Ethernet signal and an optical Ethernet signal, for communication by the second interface. In instances when the received signal comprises a wired signal that is received via the first interface, the signal may be communicated by the second interface or may be converted to an optical signal for communication by the second interface. In instances when the received signal comprises a wired Ethernet signal that is received via the second interface, the received wired Ethernet signal may be communicated via the first interface or may be converted to a wireless signal for communication by the first interface. In instances when the received signal comprises an optical Ethernet signal that is received via the second interface, the received optical Ethernet signal may be converted to one of a wireless signal and a wired signal for communication by the first interface. The conversion of the signal received via said first interface, and the conversion of the signal received via said second interface may occur concurrently.

The configurable Ethernet connector may comprise one or both of an antenna and a wireless access point, for example, one or more of the antenna circuitry 124, 224, 340, 424, and/or one or both of the wireless access points or signal converter 122 and 222. In various exemplary embodiments of the invention, a cable that is coupled to the configurable Ethernet connector, for example, the twisted pair cabling 326, may comprise an antenna, for example, the antenna circuitry 324. The configurable Ethernet connector comprising an antenna, for example, the configurable Ethernet connectors 120, 220, 320 and 420 and/or the cable comprising the antenna 326 may provide at least a subset of antenna functionality to a communication device, such as, to one of the communication devices 110, 210, 310 and/or 410. For example, the configurable Ethernet connector 320 and/or the antenna circuitry 324 within the cable 326 may provide at least a subset of antenna functionality to the communication device 310.

The communication device 310 may utilize the configurable Ethernet connector 320 for wired and/or wireline communication and may not need to have a built-in antenna or may not need a port dedicated for coupling an antenna. In addition, the configurable Ethernet connector 320 and the antenna circuitry 324 in the cable 326 may provide enhancement of antenna functionality to a communication device such as one of the communication devices 110, 210, 310 and/or 410. Accordingly, the antenna circuitry 324 may be utilized with one or more other antennas (not shown) that may be utilized by the communication device 310. For example, the antenna circuitry 324 may provide spatial diversity to the device 310 to enhance transmitted or received signal quality. Furthermore, the configurable Ethernet connector 320 may provide extension of antenna functionality to a communication device by providing an extended antenna length or an additional antenna port. For example, the antenna circuitry 324 may provide an antenna length greater than the length of the communication device 320 or greater than a reasonable length for another style of antenna attachment (not shown).

The configurable Ethernet connector, such as, for example, one of the configurable Ethernet connectors 120, 220, 320 and 420 and/or a corresponding connector, for example, one of the corresponding connectors 112, 212, 312 and 412, that may be coupled to the configurable Ethernet connector and/or the corresponding connector, may comprise one or more of a plurality of Ethernet PHY devices, a plurality of types of Ethernet PHY devices, a plurality of optical PHY devices, and a plurality of types of optical PHY devices. For example, the configurable Ethernet connector may comprise one or more of the PHY devices 116, 316 and 416. The plurality of PHY devices and/or plurality of types of PHY devices may be integrated on a single chip. A corresponding connector that is coupled to the configurable Ethernet connector, for example, one of the corresponding connectors 112, 212, 312 and 412, may sense communication protocols and/or communication capabilities of the configurable Ethernet connector. The corresponding connector may be configured based on communication protocols and/or communication capabilities of the configurable Ethernet connector. The configurable Ethernet connector may receive a wireless signal that comprises information for servicing and/or maintaining a communication device that is coupled to the configurable Ethernet connector, for example, one of the communication devices 110, 210, 310 and/or 410, and may transmit the signal to the communication device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a connector and/or cable with antenna for Ethernet and wireless applications.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   receiving a signal at a configurable Ethernet connector comprising a multiple-medium interface that includes a first multi-interface and a second multi-interface, wherein said first multi-interface comprises a wired interface and a wireless interface that are configurable to communicate corresponding wired and wireless signals, and wherein said second multi-interface comprises a wired interface and an optical interface that are configurable to communicate corresponding wired and optical signals;
   if said signal comprises a wireless signal that is received via said first multi-interface, converting said wireless signal to a wired Ethernet signal or an optical Ethernet signal for communication by said second multi-interface;
   if said signal comprises a wired signal that is received via said first multi-interface, communicating said wired signal by said second multi-interface or converting said wired signal to an optical signal for communication by said second multi-interface;
   if said signal comprises a wired Ethernet signal that is received via said second multi-interface, communicating said wired Ethernet signal by said first multi-interface or converting said wired Ethernet signal to a wireless signal for communication by said first multi-interface; and
   if said signal comprises an optical Ethernet signal that is received via said second multi-interface, converting said optical Ethernet signal to one of a wireless signal and a wired signal for communication by said first multi-interface.

2. The method according to claim 1, wherein said conversion of said signal received via said first multi-interface, and said conversion of said signal received via said second multi-interface occurs concurrently.

3. The method according to claim 1, wherein said configurable Ethernet connector comprises one or both of an antenna and a wireless access point.

4. The method according to claim 1, wherein said configurable Ethernet connector is coupled to one of a cable and a cable that comprises an antenna.

5. The method according to claim 1, comprising providing at least a subset of antenna functionality to a communication device that is communicatively coupled to said configurable Ethernet connector.

6. The method according to claim 1, wherein one or both of said configurable Ethernet connector and a corresponding connector that is coupled to said configurable Ethernet connector comprises one or more of:
   a plurality of Ethernet PHY devices;
   a plurality of types of Ethernet PHY devices;
   a plurality of optical PHY devices; and
   a plurality of types of optical PHY devices.

7. The method according to claim 1, wherein said configurable Ethernet connector comprises one or both of a mechanical or electrical switch to select communication between any of:
   said wired interface and said wireless interface of said first multi-interface; and
   said wired interface and said optical interface of said second multi-interface.

8. The method according to claim 1, wherein a corresponding connector that is coupled to said configurable Ethernet connector, one or both of:
   senses communication protocols or communication capabilities of said configurable Ethernet connector; and
   is configured based on said sensed communication protocols or communication capabilities.

9. The method according to claim 1, wherein said configurable Ethernet connector receives power via one or more of power over Ethernet (POE), a battery and a device that is coupled to said configurable Ethernet connector.

10. The method according to claim 1, comprising:
   receiving a wireless signal that comprises information for servicing or maintaining a communication device that is coupled to said configurable Ethernet connector; and
   transmitting said received wireless signal to said coupled communication device.

11. A system for communication, the system comprising:
   a configurable Ethernet connector comprising a multiple-medium interface that includes a first multi-interface and a second multi-interface, wherein said first multi-interface comprises a wired interface and a wireless interface that are configurable to communicate corresponding wired and wireless signals, and said second multi-interface comprises a wired interface and an optical interface that are configurable to communicate corresponding wired and optical signals; and
   one or more processors or circuits for use within the configurable Ethernet connector, the one or more processors or circuits operable to:
      receive a signal via said first multi-interface or said second multi-interface;
      if said signal comprises a wireless signal that is received via said first multi-interface, convert said wireless signal to a wired Ethernet signal or an optical Ethernet signal for communication by said second multi-interface;
      if said signal comprises a wired signal that is received via said first multi-interface, communicate said wired signal by said second multi-interface or convert said wired signal to an optical signal for communication by said second multi-interface;

if said signal comprises a wired Ethernet signal that is received via said second multi-interface, communicate said wired Ethernet signal via said first multi-interface or convert said wired Ethernet signal to a wireless signal for communication by said first multi-interface; and if said signal comprises an optical Ethernet signal that is received via said second multi-interface, convert said optical Ethernet signal to a wireless signal or a wired signal for communication by said first multi-interface.

12. The system according to claim 11, wherein said conversion of said signal received via said first multi-interface, and said conversion of said signal received via said second multi-interface occurs concurrently.

13. The system according to claim 11, wherein said configurable Ethernet connector comprises one or both of an antenna and a wireless access point.

14. The system according to claim 11, wherein said configurable Ethernet connector is coupled to one of a cable and a cable that comprises an antenna.

15. The system according to claim 11, wherein said one or more processors or circuits is operable to provide at least a subset of antenna functionality to a communication device that is communicatively coupled to said configurable Ethernet connector.

16. The system according to claim 11, wherein one or both of said configurable Ethernet connector and a corresponding connector that is coupled to said configurable Ethernet connector comprises one or more of:

a plurality of Ethernet PHY devices;

a plurality of types of Ethernet PHY devices;

a plurality of optical PHY devices; and a plurality of types of optical PHY devices.

17. The system according to claim 11, wherein said configurable Ethernet connector comprises one or both of a mechanical or electrical switch to select communication between any of:

said wired interface and said wireless interface of said first multi-interface; and said wired interface and said optical interface of said second multi-interface.

18. The system according to claim 11, wherein a corresponding connector that is coupled to said configurable Ethernet connector, one or both of:

senses communication protocols or communication capabilities of said configurable Ethernet connector; and is configured based on said sensed communication protocols or communication capabilities.

19. The system according to claim 11, wherein said configurable Ethernet connector receives power via one or more of power over Ethernet (POE), a battery and a device that is coupled to said configurable Ethernet connector.

20. The system according to claim 11, wherein said one or more processors or circuits is operable to:

receive a wireless signal that comprises information for servicing or maintaining a communication device that is coupled to said configurable Ethernet connector; and transmit said received wireless signal to said coupled communication device.

* * * * *